(12) United States Patent
Araki

(10) Patent No.: US 11,343,292 B2
(45) Date of Patent: *May 24, 2022

(54) INFORMATION PROCESSING APPARATUS, INFORMATION PROCESSING SYSTEM, AND REMOTE SHARING METHOD

(71) Applicant: Ricoh Company, Ltd., Tokyo (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,759

(22) Filed: Nov. 27, 2020

(65) Prior Publication Data

US 2021/0168180 A1 Jun. 3, 2021

(30) Foreign Application Priority Data

Nov. 29, 2019 (JP) .............................. JP2019-217398
Oct. 1, 2020 (JP) .............................. JP2020-166824

(51) Int. Cl.
*G06F 15/173* (2006.01)
*H04L 65/401* (2022.01)
(Continued)

(52) U.S. Cl.
CPC ........ *H04L 65/4015* (2013.01); *H04L 65/403* (2013.01); *H04N 1/32368* (2013.01)

(58) Field of Classification Search
CPC ..................... H04L 65/403; H04N 61/32368
See application file for complete search history.

(56) References Cited

U.S. PATENT DOCUMENTS 8,705,089 B2  4/2014  Araki
8,707,298 B2  4/2014  Araki
(Continued)

FOREIGN PATENT DOCUMENTS

GB     2491872       12/2012
JP     2006-005590    1/2006
JP     2019-219889   12/2019

OTHER PUBLICATIONS

Extended European Search Report for 20210433.7 dated Apr. 15, 2021.

*Primary Examiner* — Thanh T Nguyen
(74) *Attorney, Agent, or Firm* — IPUSA, PLLC

(57) ABSTRACT

An information processing apparatus includes a processor programmed to execute a process. The process includes obtaining, from apparatus management information associating identifiers of other information processing apparatuses with resources of services being used by the other information processing apparatuses, one or more of the identifiers of the other information processing apparatuses associated with resources of a service available to a user, displaying the obtained one or more of the identifiers of the other information processing apparatuses on a display device as remote connection destinations in association with the resources of the service available to the user such that the resources of the service available to the user are selectable, and performing remote sharing with one or more of the other information processing apparatuses whose identifiers are associated with a resource selected on the display device from the resources of the service available to the user.

6 Claims, 15 Drawing Sheets

(51) Int. Cl.
*H04L 65/403* (2022.01)
*H04N 1/32* (2006.01)

(56) References Cited

U.S. PATENT DOCUMENTS

| | | |
|---|---|---|
| 8,786,869 B2 | 7/2014 | Araki |
| 9,013,724 B2 | 4/2015 | Araki |
| 9,052,850 B2 | 6/2015 | Araki |
| 10,021,345 B2 | 7/2018 | Horiuchi et al. |
| 10,223,042 B2 | 3/2019 | Fukasawa et al. |
| 2009/0112671 A1 | 4/2009 | Grodum |
| 2010/0121666 A1 | 5/2010 | Niazi |
| 2013/0097686 A1* | 4/2013 | Towata ................ G06F 21/31 726/9 |
| 2014/0150055 A1* | 5/2014 | Shimono ............. G06F 21/445 726/2 |
| 2014/0283136 A1* | 9/2014 | Dougherty .......... G06F 21/6218 726/29 |
| 2016/0072800 A1* | 3/2016 | Soon-Shiong ......... G16B 50/00 726/7 |
| 2017/0024739 A1* | 1/2017 | Todasco ................ G06Q 20/14 |
| 2017/0337542 A1* | 11/2017 | Kim ....................... G06F 3/048 |
| 2018/0067700 A1 | 3/2018 | Araki |
| 2019/0005462 A1 | 1/2019 | Brennan et al. |
| 2019/0020770 A1 | 1/2019 | Araki |
| 2019/0129669 A1 | 5/2019 | Takahashi et al. |
| 2019/0235735 A1 | 8/2019 | Toyota et al. |
| 2019/0384536 A1 | 12/2019 | Araki |
| 2019/0387033 A1 | 12/2019 | Araki |
| 2020/0153719 A1* | 5/2020 | Chauhan ................ H04L 67/22 |
| 2020/0196122 A1* | 6/2020 | Junk ..................... H04L 9/3013 |

\* cited by examiner

FIG.5

SERVICE ACCOUNT INFORMATION

| USER ID | NAME | EMAIL ADDRESS |
|---|---|---|
| a01 | Mary | a01@example.com |
| a02 | Sato | a02@example.com |
| a03 | Alice | a03@example.com |
| a04 | Saito | a04@example.com |
| ... | ... | ... |

FIG.6

MEETING SCHEDULE INFORMATION

| SCHEDULE NAME | OWNER USER | START TIME AND END TIME | SCHEDULED PARTICIPANT LIST | ATTACHED FILE |
|---|---|---|---|---|
| Meeting01 | a01, b02 | 2010-04-05 10:00–12:00 | a01, a02, a04 | a01.doc |
| ... | ... | ... | ... | ... |

FIG.7

STORAGE INFORMATION

| OWNER USER | TYPE | NAME |
|---|---|---|
| a02 | FILE | a02.doc |
| a02 | FOLDER | /WeeklyMeeting |

FIG.8

SHARED SITE INFORMATION

| SITE NAME | USER | TYPE | NAME |
|---|---|---|---|
| A-Group-Site | a01, a02 | FILE | a-shared01.doc |
| | | FOLDER | /DailyMeeting |
| B-Group-Site | b01, b02 | FOLDER | /WeeklyMeeting |

FIG.9

USER INFORMATION LIST

| USER ID | NAME | SETTING INFORMATION | SERVICE INFORMATION | IDENTIFICATION INFORMATION |
|---|---|---|---|---|
| user001 | Mary Smith | setting1 | service11, | ICCARD-123 |
| user002 | Sato Suzuki | setting2 | service21, | ICCARD-248 |
| user003 | Alice Liddell | setting3 | service31 | ICCARD-390 |
| user004 | Saito Yu | setting4 | service41 | ICCARD-450 |
| ... | | | ... | |

FIG.10

SERVICE INFORMATION LIST

| SERVICE INFORMATION | USER ID | ADDRESS INFORMATION | USER ID FOR EXTERNAL SERVICE | AUTHENTICATION TOKEN FOR EXTERNAL SERVICE |
|---|---|---|---|---|
| service11 | user001 | office.example.com | a01 | eyJhbGc11... |
| service21 | user002 | office.example.com | a02 | eyJhbGc21... |
| service31 | user003 | office.example.com | a03 | eyJhbGc31... |
| service41 | user004 | office.example.com | a04 | eyJhbGc41... |
| ... | | ... | | ... |

FIG.11

APPARATUS MANAGEMENT INFORMATION

| APPARATUS IP ADDRESS | SCHEDULE NAME | FILE NAME | STORAGE FOLDER | SHARED SITE INFORMATION | PARTICIPANT |
|---|---|---|---|---|---|
| 192.168.0.2 | Meeting01 | | /DailyMeeting | A-Group-Site | user001, user002, user004 |
| 192.168.0.3 | | | | B-Group-Site | user005 |
| 192.168.0.4 | | | | | user004 |
| 192.168.0.5 | | | | | |
| ... | ... | ... | ... | ... | ... |

FIG.14

| SERVICE INFORMATION | USER ID | ADDRESS INFORMATION | USER ID FOR EXTERNAL SERVICE | AUTHENTICATION TOKEN FOR EXTERNAL SERVICE |
|---|---|---|---|---|
| service11 | user001 | office.example.com | a01 | eyJhbGc11··· |

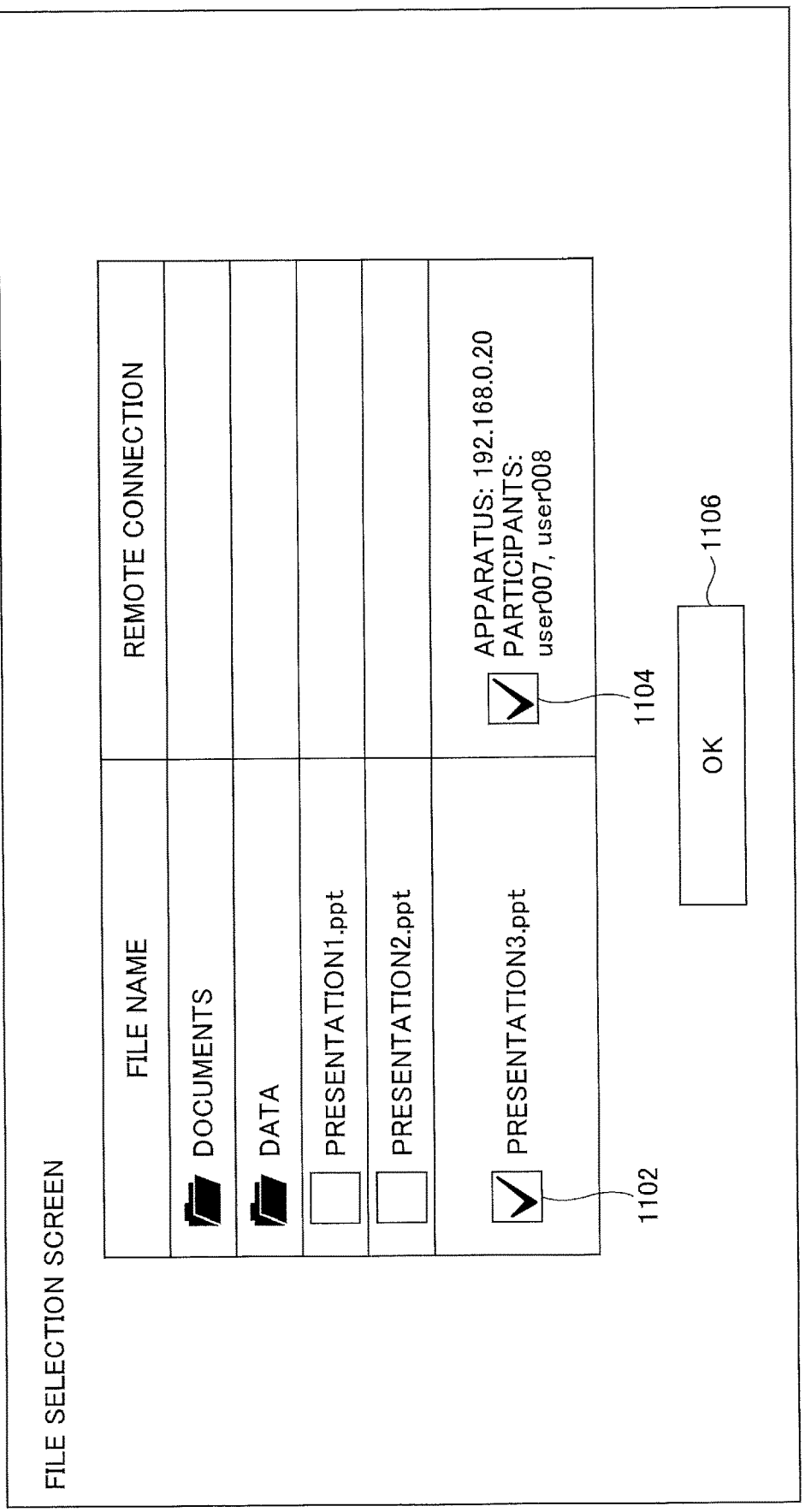

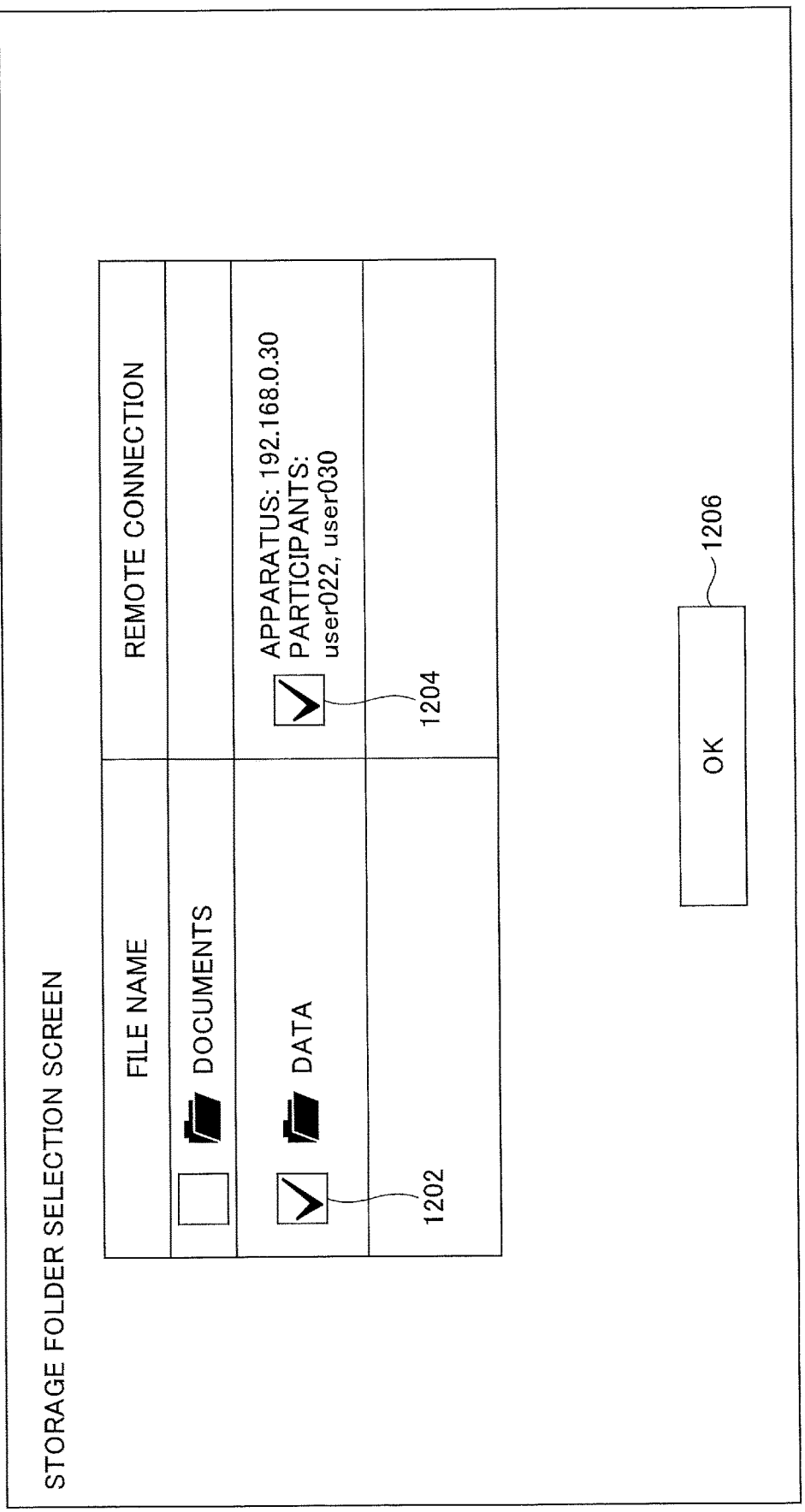

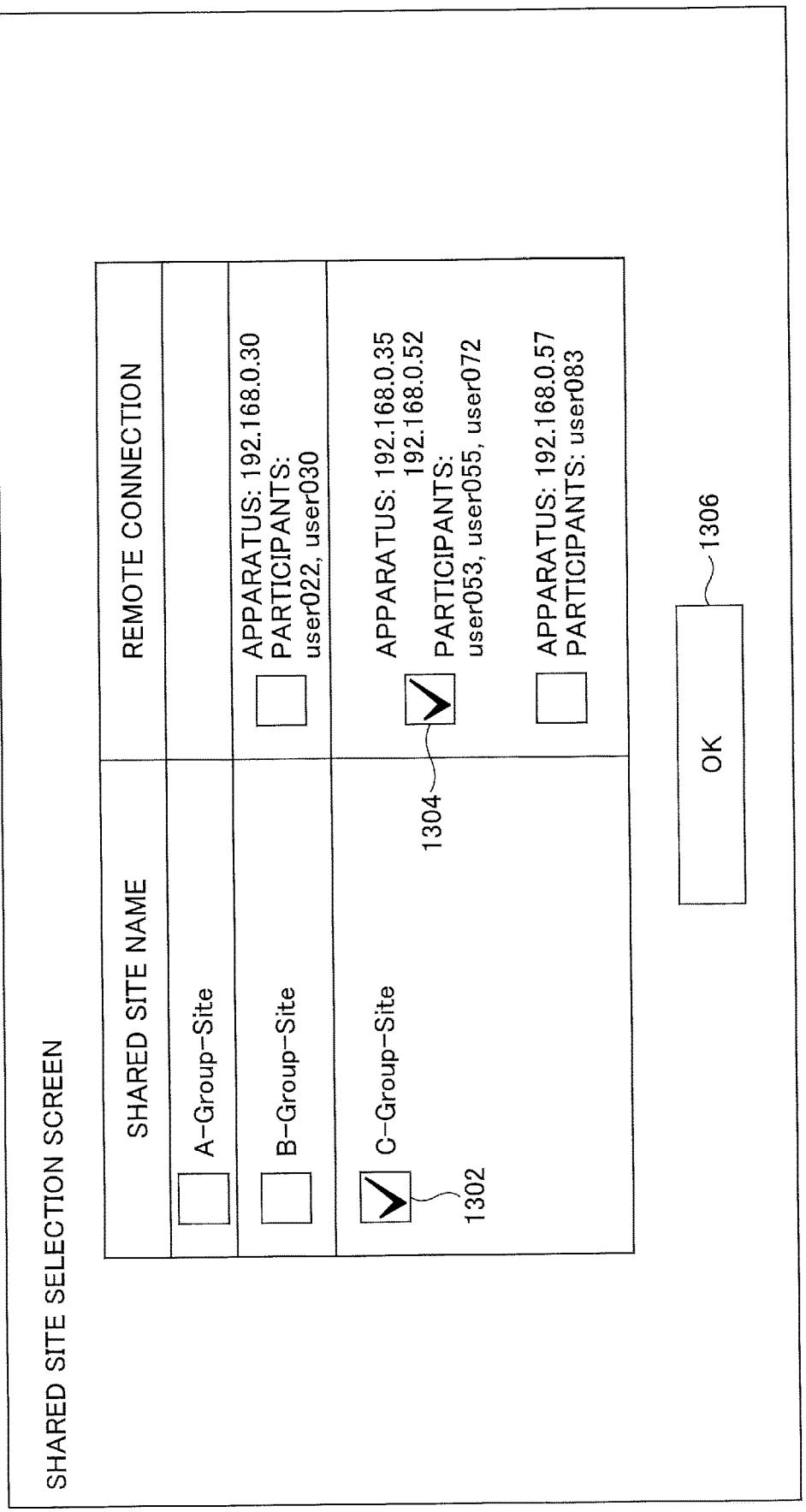

INFORMATION PROCESSING APPARATUS, INFORMATION PROCESSING SYSTEM, AND REMOTE SHARING METHOD

CROSS-REFERENCE TO RELATED APPLICATIONS

The present application claims priority under 35 U.S.C. § 119 to Japanese Patent Application No. 2019-217398, filed on Nov. 29, 2019 and Japanese Patent Application No. 2020-166824, filed on Oct. 1, 2020, the contents of which are incorporated herein by reference in their entirety.

BACKGROUND OF THE INVENTION

1. Field of the Invention

An aspect of this disclosure relates to an information processing apparatus, an information processing system, and a remote sharing method.

2. Description of the Related Art

There is a known electronic blackboard that can remotely share written information, camera images, and/or microphone sounds with another electronic blackboard or a PC.

For example, a known remote conference system connects multiple sites to enable remote collaborative work. An example of such a remote conference system is a video conference system. A video conference system generally includes image and audio input-output devices such as a camera, a microphone, a monitor, and a speaker, image and audio coding and decoding devices, and communication devices and lines for connecting multiple sites. Also, to share data among remote meeting rooms, electronic blackboards are provided in the meeting rooms to enable participants to write information on the electronic blackboards and share and operate applications (see, for example, Japanese Unexamined Patent Application Publication No. 2006-005590).

However, with the related-art electronic blackboard, to select another electronic blackboard or an information processing apparatus such as a PC as a remote connection destination, it is necessary to use an IP address or an ID of the electronic blackboard or the information processing apparatus that is not directly associable with the remote connection destination and is therefore troublesome.

SUMMARY OF THE INVENTION

According to an aspect of this disclosure, there is provided an information processing apparatus that includes a processor programmed to execute a process. The process includes obtaining, from apparatus management information associating identifiers of other information processing apparatuses with resources of services being used by the other information processing apparatuses, one or more of the identifiers of the other information processing apparatuses associated with resources of a service available to a user, displaying the obtained one or more of the identifiers of the other information processing apparatuses on a display device as remote connection destinations in association with the resources of the service available to the user such that the resources of the service available to the user are selectable, and performing remote sharing with one or more of the other information processing apparatuses whose identifiers are associated with a resource selected on the display device from the resources of the service available to the user.

BRIEF DESCRIPTION OF THE DRAWINGS

FIG. 5 is a drawing illustrating an example of service account information;

FIG. 6 is a drawing illustrating an example of meeting schedule information;

FIG. 7 is a drawing illustrating an example of storage information;

FIG. 8 is a drawing illustrating an example of shared site information;

FIG. 9 is a drawing illustrating an example of a user information list;

FIG. 10 is a drawing illustrating an example of a service information list;

FIG. 11 is a drawing illustrating an example of apparatus management information;

FIG. 14 is a drawing illustrating an example of service information identified based on obtained identification information;

FIG. 16 is a drawing illustrating an example of a file selection screen;

FIG. 17 is a drawing illustrating an example of a storage folder selection screen; and FIG. 18 is a drawing illustrating an example of a shared site selection screen.

DESCRIPTION OF THE EMBODIMENTS

An aspect of this disclosure makes it possible to provide an information processing apparatus that can reduce the trouble of a user in selecting another information processing apparatus as a remote connection destination.

An embodiment of the present invention is described below with reference to the accompanying drawings. In the present embodiment, an electronic blackboard is described as an example of an information processing apparatus that performs remote sharing. However, the information processing apparatus is not limited to an electronic blackboard and may be, for example, a personal computer (PC).

<System Configuration>

Figure 1:
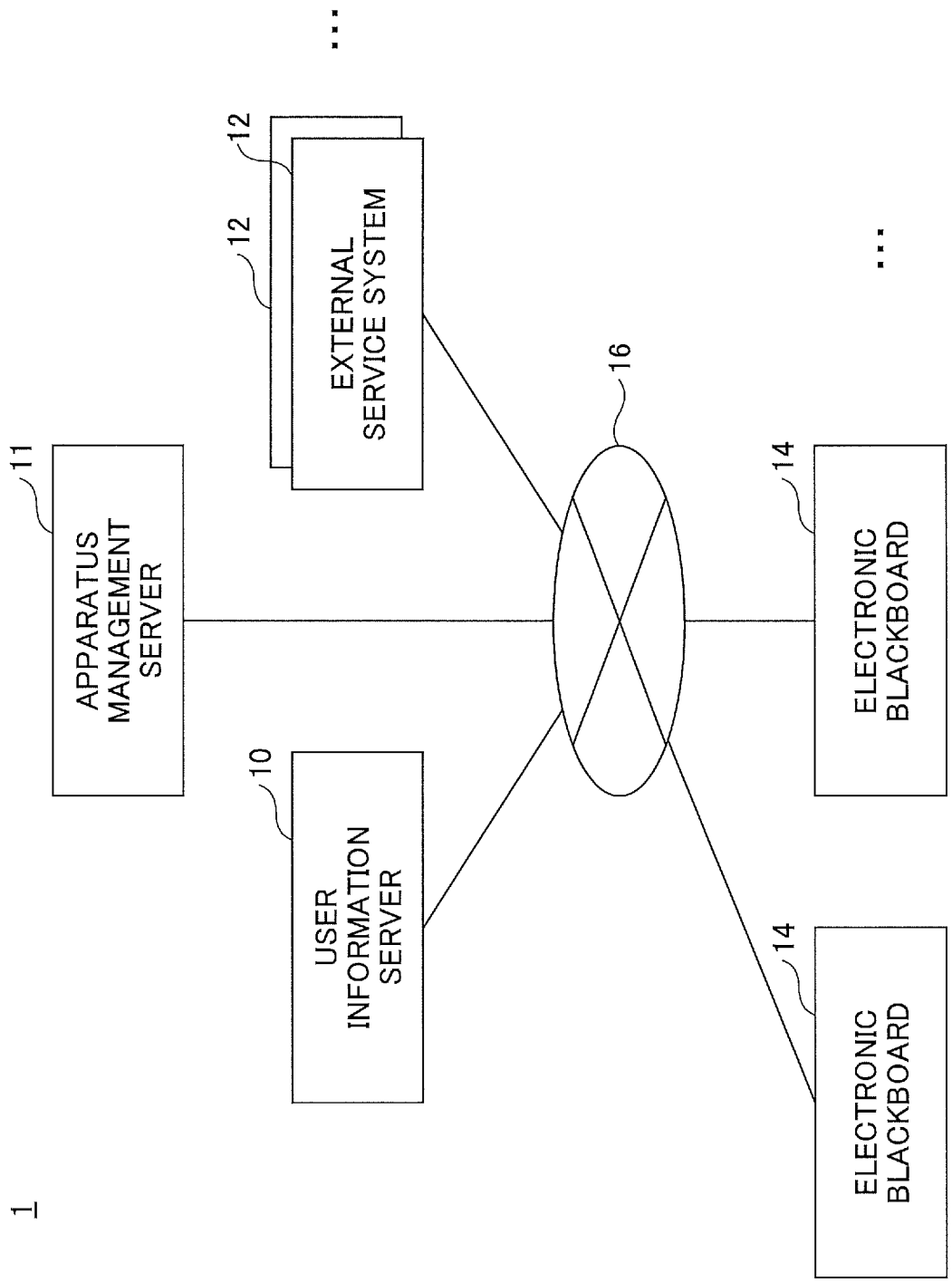
FIG. 1 is a drawing illustrating an example of a configuration of an information processing system according to an embodiment.

FIG. 1 is a drawing illustrating an example of a configuration of an information processing system 1 according to the present embodiment. The information processing system 1 of FIG. 1 includes a user information server 10, an apparatus management server 11, one or more external service systems 12, and multiple electronic blackboards 14 that are connected to and can communicate with each other via a network 16 such as the Internet or a LAN.

The user information server 10, the apparatus management server 11, and the electronic blackboards 14 constitute an electronic blackboard system. The electronic blackboard system operates in cooperation with the external service systems 12 outside of the electronic blackboard system and thereby provides functions related to the electronic blackboards 14.

An external service group provided by the external service system 12 may be, for example, an integrated service such as Office 365 (registered trademark) including a user service, a schedule service, a file service, and a shared site service.

The external service group is provided such that services including the user service, the schedule service, the file service, and the shared site service can be used with the same user account. The external service group provided by the external service system 12 is also referred to as groupware, and services belonging to the same external service group can be used with the same authentication information (e.g., a combination of an ID and a password or an access token).

On or more external service groups may be provided, and different external service groups may be provided for respective users. Services in the external service group are not necessarily operated by different providers (such as companies), and are not necessarily external services as long as the user service, the schedule service, the file service, and the shared site service are included. The external service system 12 may be implemented by one or more computers.

The user information server 10 stores, for example, a user information list described later and is used by the electronic blackboard 14. The user information server 10 may be shared by multiple electronic blackboards 14 and may not necessarily be in the same network segment as the electronic blackboards 14. Also, the user information server 10 may be included in the electronic blackboard 14. The user information server 10 is implemented by one or more computers. The apparatus management server 11 stores, for example, apparatus management information described later and is used by the electronic blackboards 14. The apparatus management server 11 is implemented by one or more computers. In the example of FIG. 1, the user information server 10 and the apparatus management server 11 are provided separately. However, the user information server 10 and the apparatus management server 11 may be implemented by one server apparatus.

The electronic blackboard 14 displays, for example, an image drawn with an electronic pen or a hand. The electronic blackboard 14 can also display an image in an electronic file read from, for example, a USB memory, a PC connected via a cable, or the external service system 12. The electronic blackboard 14 includes a function for remotely sharing image data of a displayed image with other electronic blackboards 14 remotely connected to the electronic blackboard 14. In remote sharing, the electronic blackboard 14 shares, for example, written information, a camera image, and/or a microphone sound with other electronic blackboards 14. Also, the electronic blackboard 14 includes an authentication function for performing user authentication such as IC card authentication or face authentication.

The electronic blackboard 14 is an example of an information processing apparatus, and any type of information processing apparatus such as a remote conference system, a display, or a projector including a remote sharing function may be used. The remote sharing function of the information processing apparatus may be implemented in any manner. For example, data may be transmitted and received directly between apparatuses, or data may be transmitted and received via an intermediary server. Thus, the configuration of the information processing system 1 illustrated in FIG. 1 is an example. For example, at least some of the functions of the user information server 10, the apparatus management server 11, and the external service system 12 may be provided in the electronic blackboard 14. Further, the information processing system 1 may also be configured such that at least some of the functions of the user information server 10, the apparatus management server 11, the external service system 12, and the electronic blackboard 14 are implemented by an information processing apparatus other than the user information server 10, the apparatus management server 11, the external service system 12, and the electronic blackboard 14.

<Hardware Configuration>
<<Computer>>

Figure 2:
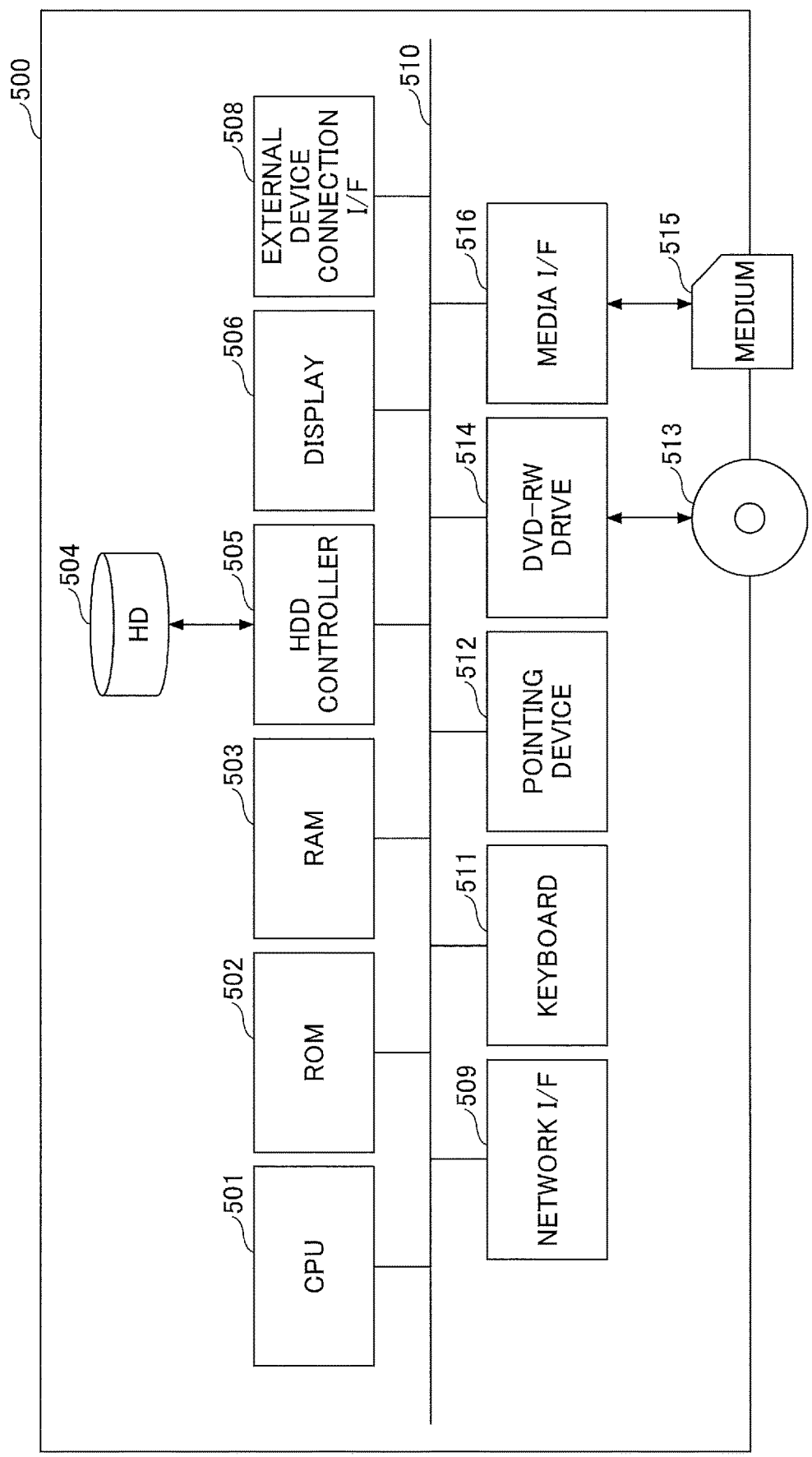
FIG. 2 is a drawing illustrating an example of a hardware configuration of a computer according to an embodiment.

Each of the user information server 10, the apparatus management server 11, and the external service system 12 illustrated in FIG. 1 may be implemented by, for example, a computer 500 with a hardware configuration illustrated in FIG. 2. FIG. 2 illustrates an example of a hardware configuration of the computer 500 according to the present embodiment.

As illustrated in FIG. 2, the computer 500 includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media I/F 516.

The CPU 501 controls the entire operations of the computer 500 according to a program. The ROM 502 stores programs such as an IPL for driving the CPU 501 The RAM 503 is used as a work area for the CPU 501. The HD 504 stores various types of data such as programs. The HDD controller 505 controls reading and writing of various types of data from and to the HD 504 under the control of the CPU 501.

The display 506 displays various types of information such as a cursor, menus, windows, characters, and images. The external device connection I/F 508 is an interface for connecting various external devices. Examples of external devices include a universal serial bus (USB) memory and a printer. The network I/F 509 is an interface for data communications via the network 16. The data bus 510 is, for example, an address bus or a data bus for electrically connecting components such as the CPU 501 to each other.

The keyboard 511 is an example of an input unit including multiple keys for inputting characters, numerical values, and various instructions. The pointing device 512 is an example of an input unit for selecting and executing various instructions, selecting an object, and moving a cursor. The DVD-RW drive 514 controls reading and writing of various types of data from and to a DVD-RW 513, which is an example of a removable recording medium. The DVD-RW drive 514 may support not only a DVD-RW but also other recording media such as a DVD-R. The media I/F 516 controls reading and writing (storing) of data from and to a recording medium 515 such as a flash memory.

<<Electronic Blackboard>>

Figure 3:
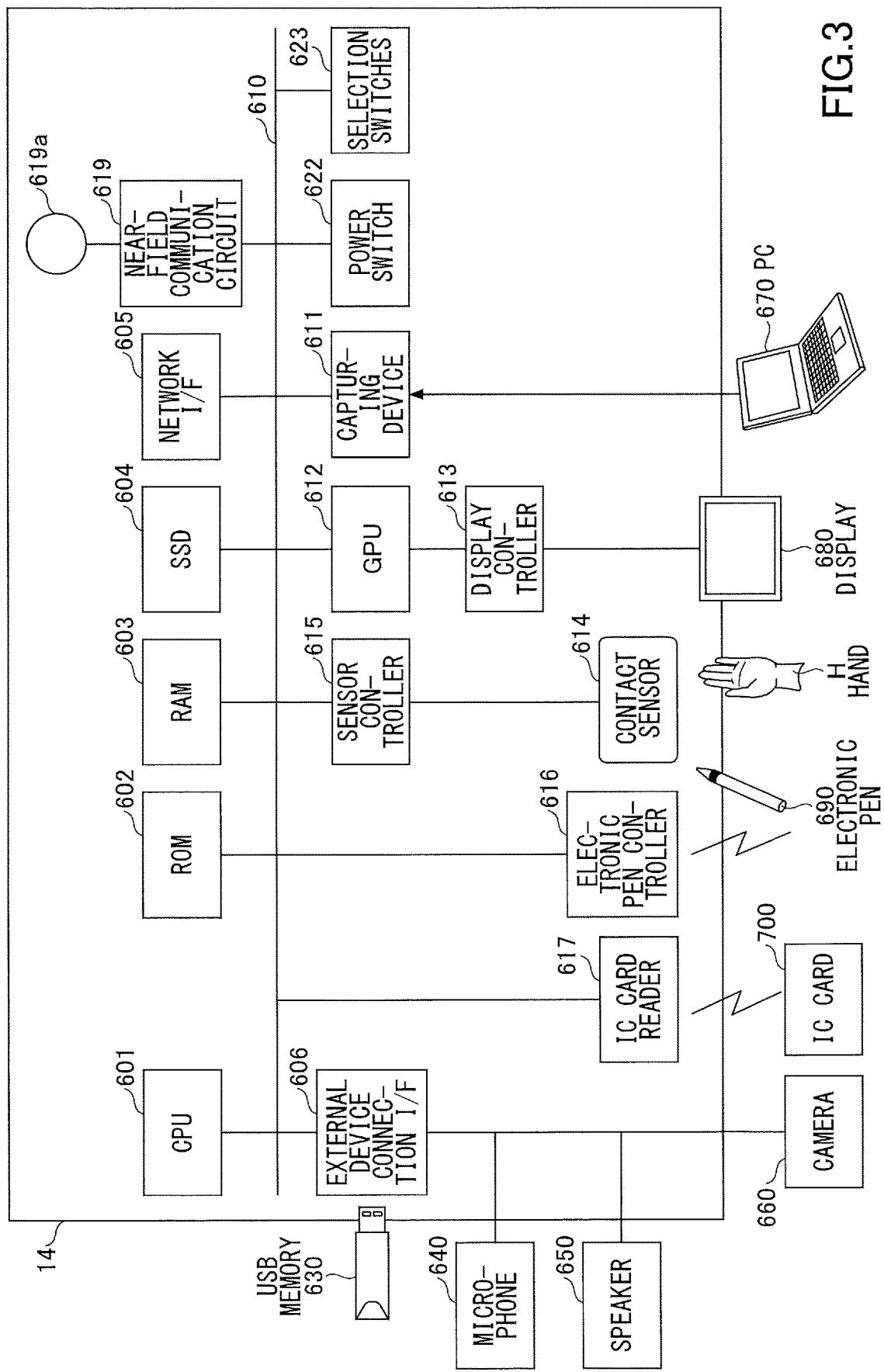
FIG. 3 is a drawing illustrating an example of a hardware configuration of an electronic blackboard according to an embodiment.

FIG. 3 is a drawing illustrating an example of a hardware configuration of the electronic blackboard 14 according to the present embodiment. As illustrated in FIG. 3, the electronic blackboard 14 includes a CPU 601, a ROM 202, a RAM 603, a solid state drive (SSD) 604, a network I/F 605, and an external device connection I/F 606.

The CPU 601 controls the entire operations of the electronic blackboard 14 according to a program. The ROM 602 stores programs such as an IPL for driving the CPU 601 The RAM 603 is used as a work area for the CPU 601. The SSD 604 stores various types of data such as programs for the electronic blackboard 14.

The network I/F 605 controls communications with the network 16. The external device connection I/F 606 is an interface for connecting various external devices. Examples of external devices include a USB memory 630, a microphone 640, a speaker 650, and a camera 660.

The electronic blackboard 14 also includes a capturing device 611, a GPU 612, a display controller 613, a contact sensor 614, a sensor controller 615, an electronic pen controller 616, an IC card reader 617, a near-field-communication circuit 619, an antenna 619a of the near-field-communication circuit 619, a power switch 622, and selection switches 623.

The capturing device 611 displays image information as a still image or a video on a display of an external PC 670. The graphics processing unit (GPU) 612 is a semiconductor chip that is dedicated for graphics processing. The display controller 613 performs display control and management to output images from the GPU 612 to, for example, a display 680.

The contact sensor 614 detects that an electronic pen 690 or a hand H of the user contacts the display 680. The sensor controller 615 controls the contact sensor 614. The contact sensor 614 inputs and detects coordinates according to an infrared light blocking method. For example, coordinates may be input and detected by using two light receiving-emitting devices disposed at the upper ends of the display 680. The light receiving-emitting devices emit multiple infrared rays in parallel with the display 680, and light receiving elements receive the infrared rays that are reflected by a reflecting part provided on the periphery of the display 680 and return along the same optical paths as the optical paths of the emitted infrared rays.

The contact sensor 614 outputs IDs of infrared rays emitted by the two light emitting-receiving devices and blocked by an object to the sensor controller 615, and the sensor controller 615 identifies a coordinate position corresponding to the contact position of the object. The electronic pen controller 616 communicates with the electronic pen 690 and determines whether the pen tip or the pen tail is contacting the display 680.

The IC card reader 617 wirelessly reads identification information unique to an IC card 700 from an RF tag embedded in the IC card 700. The IC card reader 617 may be built in the electronic blackboard 14 or may be attached to the electronic blackboard 14 as an external device. The IC card 700 may be provided in a smart device such as a smartphone. The electronic blackboard 14 may use a device such as a biometric authentication device (for detecting, for example, a fingerprint, a palm print, an iris, or a face) or a bar code reader instead of the IC card reader 617 as long as the device can obtain identification information for identifying a user.

The near-field-communication circuit 619 is, for example, a communication circuit for NFC or Bluetooth (registered trademark). The power switch 622 is used to power on and off the electronic blackboard 14. The selection switches 623 are, for example, switches for adjusting the brightness and hue of the display 680.

The electronic blackboard 14 also includes a bus line 610. The bus line 610 is, for example, an address bus or a data bus for electrically connecting components such as the CPU 601 illustrated in FIG. 3 to each other.

The contact sensor 614 is not limited to an infrared-light blocking touch panel, but may also be implemented by various types of detection units such as a capacitive touch panel that identifies a contact position by detecting a change in capacitance, a resistive touch panel that identifies a contact position based on a voltage change between opposing two resistance films, and an electromagnetic induction touch panel that identifies a contact position by detecting electromagnetic induction generated when an object contacts a display. Also, the electronic pen controller 616 may be configured to determine the contact of not only the tip and the tail of the electronic pen 690, but also the contact of a grip and other portions of the electronic pen 690.

<Functional Configuration>

Figure 4:
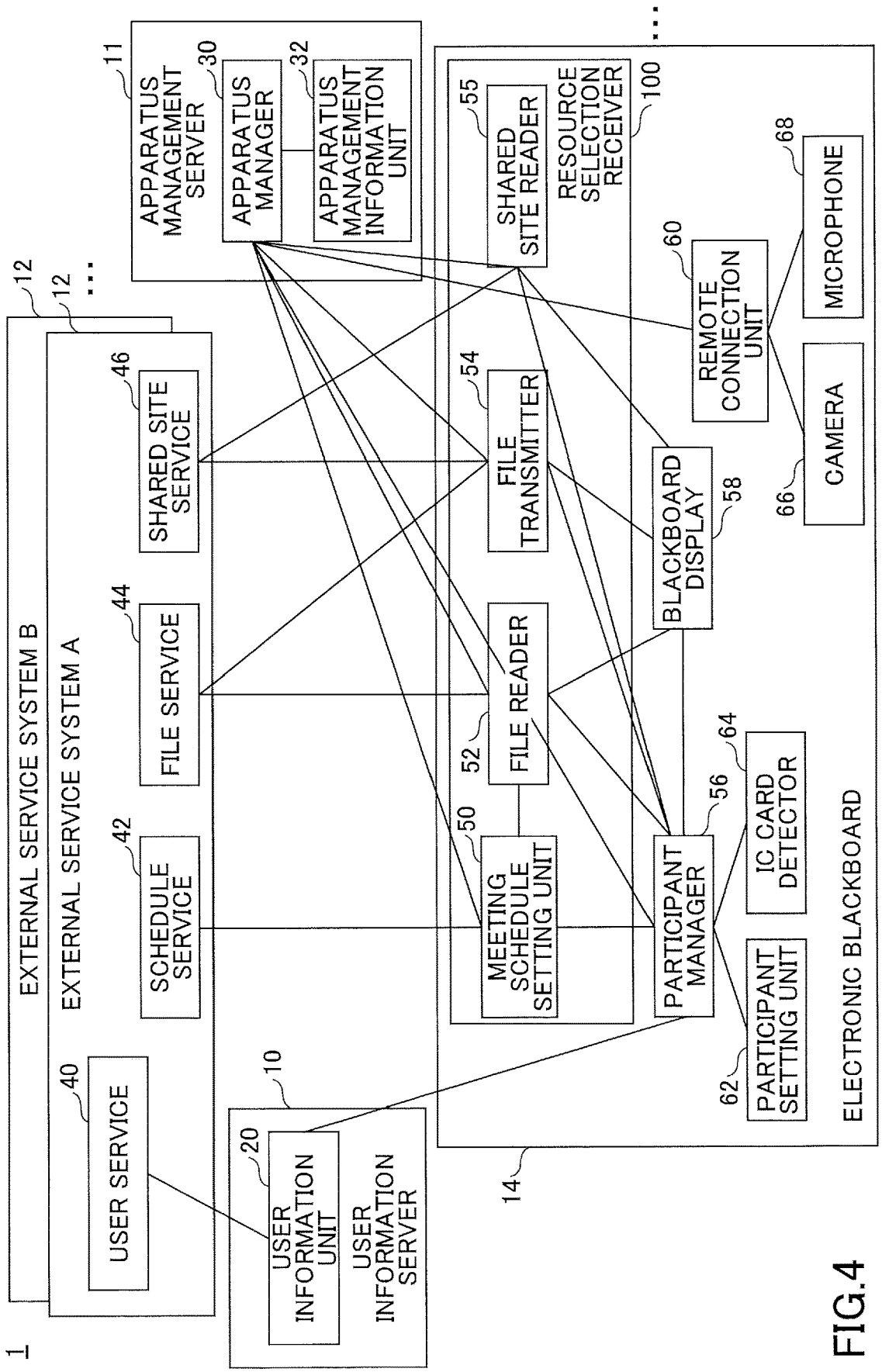
FIG. 4 is a drawing illustrating an example of a functional configuration of the information processing system according to an embodiment.

The information processing system 1 of the present embodiment is implemented by, for example, a functional configuration as illustrated in FIG. 4. FIG. 4 is a drawing illustrating an example of a functional configuration of the information processing system 1 of the present embodiment. In the functional configuration of FIG. 4, components not necessary for the explanation of the present embodiment are omitted.

The information processing system 1 of FIG. 4 includes the user information server 10, the apparatus management server 11, one or more external service systems 12, and multiple electronic blackboards 14. The external service system 12 in the example of FIG. 4 is an integrated service including a user service 40, a schedule service 42, a file service 44, and a shared site service 46 as an external service group provided to the user.

The user service 40 of the external service system 12 stores, for example, service account information illustrated in FIG. 5. FIG. 5 is a drawing illustrating an example of service account information. The service account information of FIG. 5 includes a user ID, a name, and an email address of each user (a user of external services) who uses the external service system 12.

The schedule service 42 stores, for example, meeting schedule information illustrated in FIG. 6 as an example of schedule information. FIG. 6 is a drawing illustrating an example of meeting schedule information. The schedule service 42 manages meeting schedules of users based on the meeting schedule information of FIG. 6.

As illustrated in FIG. 6, the meeting schedule information includes a schedule name, an owner user, start time and end time, a scheduled participant list, and an attached file. The schedule name is an example of meeting schedule identification information and is the name of a meeting schedule. The owner user is an example of information that identifies a user who owns the meeting schedule information.

The start time and end time is an example of information indicating a scheduled date on which the scheduled meeting is conducted and the duration of the scheduled meeting, i.e., a scheduled start time and a scheduled end time of the scheduled meeting (scheduled start and end time). The scheduled participant list is an example of information indicating a list of participants scheduled to participate in the scheduled meeting. The attached file is an example of information indicating a file attached to the meeting schedule.

The file service 44 can store and read files of users, and stores, for example, storage information illustrated in FIG. 7. FIG. 7 is a drawing illustrating an example of the storage information. For example, the storage information of FIG. 7 includes an owner user who owns a file or a folder, a type indicating "file" or "folder", and a name of the file or the folder. Thus, the storage information manages types such "file" and "folder" and the names of files and folders for each user who owns the files and the folders.

The shared site service 46 provides a site (shared site) that is shared (or used) by multiple users. In the shared site, users can read and store files. Also, shared sites may be generated for respective purposes. That is, multiple users working for the same purpose (multiple users working as a group) can read and store files in the same shared site.

The shared site service 46 stores, for example, shared site information illustrated in FIG. 8. FIG. 8 is a drawing illustrating an example of shared site information. The shared site information of FIG. 8 includes a site name, a user, a type such as "file" or "folder", and a name of a file or a folder. The site name is an example of information that identifies a shared site. The user is an example of identification information of a user who can use a file and a folder of a shared site that are identified by types and names.

Thus, the shared site information of FIG. 8 manages, for each shared site, users who can use files and folders of the shared site.

The user information server 10 includes a user information unit 20. The user information unit 20 stores a user information list as illustrated in FIG. 9 and a service information list as illustrated in FIG. 10. FIG. 9 is a drawing illustrating an example of a user information list. FIG. 10 is a drawing illustrating an example of a service information list.

The user information list of FIG. 9 includes user IDs, names, setting information, service information, and identification information of users (users of the electronic blackboard system) who are managed in the electronic blackboard system. The service information list of FIG. 10 is information that associates user IDs of users of the electronic blackboard system with user IDs of users of external services, and includes service information, user IDs for the electronic blackboard system, address information, user IDs for external services, and authentication tokens for the external services.

The service information in the user information list is information for identifying service information in the service information list of FIG. 10. The identification information identifies a user and is input from an IC card detector 64 described later. For example, identification information "IC CARD-123" in FIG. 9 is an example of identification information that is unique to an IC card 700 and input from the IC card detector 64. With the user information list of FIG. 9, it is possible to identify a user based on the identification information, and identify service information of the user in the service information list of FIG. 10.

The service information list of FIG. 10 is a list of service information necessary for users to use the external service system 12. In the service information list, one user may have an account (a user ID, a name, and an email address) for each external service group. Each user may have accounts for one or more external service groups. For example, when one user uses two external service groups, two records of service information exist for the user.

That is, the service information list includes sets of service information that are identifiers for uniquely identifying all accounts for using the information processing system 1 regardless of external service groups for which the accounts are used. The address information and the user ID for the external service are examples of connection information used to connect to the external service system 12. The authentication token for the external service is an example of authentication information of the external service system 12.

The electronic blackboard 14 of FIG. 4 includes a meeting schedule setting unit 50, a file reader 52, a file transmitter 54, a shared site reader 55, a participant manager 56, a blackboard display 58, a remote connection unit 60, a participant setting unit 62, an IC card detector 64, a camera 66, and a microphone 68. The meeting schedule setting unit 50, the file reader 52, the file transmitter 54, and the shared site reader 55 function as resource selection receiver 100.

The IC card detector 64 reads identification information from the IC card 700 of a user. The participant manager 56 sends the identification information read by the IC card detector 64 to the user information server 10 and obtains service information of the user corresponding to the identification information from the user information unit 20 of the user information server 10. The participant manager 56 sends the service information of the user obtained from the user information unit 20 to the meeting schedule setting unit 50, the file reader 52, the file transmitter 54, and the shared site reader 55. Also, the participant manager 56 sends a user ID of the user corresponding to the identification information to the apparatus management server 11 to cause the apparatus management server 11 to manage participants.

Based on the service information of the user received from the participant manager 56, the meeting schedule setting unit 50 obtains meeting schedule information that includes the user in the scheduled participant list from the schedule service 42. Also, the meeting schedule setting unit 50 includes a user interface (UI) that enables the user to select a schedule (selection candidate schedule) in the obtained meeting schedule information.

Before displaying the UI that enables the user to select a selection candidate schedule, the meeting schedule setting unit 50 obtains apparatus management information described later from the apparatus management server 11. The meeting schedule setting unit 50 searches the obtained apparatus management information for other electronic blackboards 14 selecting the same schedule as the selection candidate schedule. When an electronic blackboard 14 selecting the same schedule as the selection candidate schedule is found, the meeting schedule setting unit 50 displays the found electronic blackboard 14 as a remote connection destination.

When a schedule is selected by the user and another electronic blackboard 14 selecting the same schedule as the selected schedule is found, the meeting schedule setting unit 50 performs remote sharing with the found electronic blackboard 14 as described later.

Also, the meeting schedule setting unit 50 can send information on an attached file included in the meeting schedule information of the schedule selected by the user to the file reader 52 and obtain the attached file from the external service system 12. The schedule selected by the user does not necessarily include an attached file. When a schedule is selected by the user, in addition to or instead of reading the information on the attached file, information on participants included in the scheduled participant list may be obtained. When a schedule is selected by the user, the meeting schedule setting unit 50 sends the identifier of the electronic blackboard 14 and information on the schedule selected by the user to the apparatus management server 11.

The identifier of the electronic blackboard 14 may be any type of information such as an IP address or a MAC address that can identify the electronic blackboard 14. The information on the schedule may be a schedule name or an ID of the schedule.

Based on the service information of the user received from the participant manager 56, the file reader 52 reads a file from the file service 44 of the external service system 12 into the electronic blackboard 14. The file reader 52 includes a UI that enables the user to select a file (selection candidate file) to be read from the file service 44 of the external service system 12 into the electronic blackboard 14. Before displaying the UI that enables the user to select a selection candidate file, the file reader 52 obtains apparatus management information described later from the apparatus management server 11. The file reader 52 searches the obtained apparatus management information for other electronic blackboards 14 selecting the same file as the selection candidate file. When an electronic blackboard 14 that has read the same file as the selection candidate file is found, the file reader 52 displays the found electronic blackboard 14 as a remote connection destination.

When a file is selected by the user and another electronic blackboard 14 selecting the same file as the file selected by the user is found, the file reader 52 performs remote sharing with the found electronic blackboard 14 as described later.

Also, when a file in the file service 44 is selected by the user as a file to be read, the file reader 52 sends the identifier of the electronic blackboard 14 and information on the selected file to the apparatus management server 11. The information on the file may be a file name, a file path, or an ID indicating the file.

The shared site reader 55 includes a function to read a file from the shared site service 46 of the external service system 12 into the electronic blackboard 14 by using the service information of the user received from the participant manager 56, and a function to provide a web page including a chat function and a whiteboard function. Also, the shared site reader 55 includes a UI that enables the user to select the shared site service 46 (selection candidate shared site) of an external service system 12 from which a file is to be read into the electronic blackboard 14. Before displaying the UI that enables the user to select the selection candidate shared site, the shared site reader 55 obtains apparatus management information described later from the apparatus management server 11. The shared site reader 55 searches the obtained apparatus management information for other electronic blackboards 14 selecting the same shared site as the selection candidate shared site. When an electronic blackboard 14 selecting the same shared site as the selection candidate shared site is found, the shared site reader 55 displays the found electronic blackboard 14 as a remote connection destination.

When a shared site is selected by the user and another electronic blackboard 14 selecting the same shared site as the shared site selected by the user is found, the shared site reader 55 performs remote sharing with the found electronic blackboard 14 as described later.

Similarly to the file reader 52, when a shared site of the shared site service 46, from which a file is to be read, is selected by the user, the shared site reader 55 sends the identifier of the electronic blackboard 14 and information on the shared site selected by the user to the apparatus management server 11. The information on the shared site may be any identifier such as a site name, a site ID, or a URL that can be obtained from the shared site service 46.

The file transmitter 54 obtains written information written on the electronic blackboard 14 from the blackboard display 58 and sends a file containing the written information to the file service 44 or the shared site service 46 by using the service information of the user received from the participant manager 56 to request the file service 44 or the shared site service 46 to store the file.

The file transmitter 54 includes a UI that includes a screen for selecting a storage folder (selection candidate storage folder) in which a file is to be stored and a screen for storing the file in the storage folder. Before displaying the UI that enables the user to select a selection candidate storage folder, the file transmitter 54 obtains apparatus management information described later from the apparatus management server 11. The file transmitter 54 searches the obtained apparatus management information for other electronic blackboards 14 selecting the same storage folder as the selection candidate storage folder. When an electronic blackboard 14 selecting the same storage folder as the selection candidate storage folder is found, the file transmitter 54 displays the found electronic blackboard 14 as a remote connection destination.

When a storage folder is selected by the user and an electronic blackboard 14 selecting the same storage folder as the storage folder selected by the user is found, the file transmitter 54 performs remote sharing with the found electronic blackboard 14 as described below.

For example, the user selects a storage folder at the start of a meeting and stores a file in the selected storage folder at the end of the meeting. Also, when a storage folder is selected, the file transmitter 54 sends the identifier of the electronic blackboard 14 and information on the selected storage folder to the apparatus management server 11.

The blackboard display 58 displays a file read by the file reader 52 or the shared site reader 55 from the file service 44 or the shared site service 46. Also, the blackboard display 58 receives information written by the user on the electronic blackboard 14 and displays the written information. Further, the blackboard display 58 provides, to the file transmitter 54, written information including the contents of a file read by the file reader 52 or the shared site reader 55 from the file service 44 or the shared site service 46 and the information written by the user on the electronic blackboard 14. The remote connection unit 60 performs remote sharing of, for example, written information, a camera image, and/or a microphone sound with other electronic blackboards 14 by using IP addresses.

The apparatus management server 11 illustrated in FIG. 4 includes an apparatus manager 30 and an apparatus management information unit 32. The apparatus manager 30 writes information received from the meeting schedule setting unit 50, the file reader 52, the file transmitter 54, or the shared site reader 55 into apparatus management information illustrated in FIG. 11. The apparatus management information unit 32 stores apparatus management information as illustrated in FIG. 11. FIG. 11 is a drawing illustrating an example of apparatus management information.

The apparatus management information illustrated in FIG. 11 stores, for example, a schedule name, a file name, a storage folder, shared site information, and participants in association with an IP address (apparatus IP address), which is an example of information for identifying the electronic blackboard 14. The schedule name in the apparatus management information may be selected by the user or may be automatically selected based on the authentication of the user and a time. The schedule name in the apparatus management information is not necessarily selected by the user, and is not necessarily a resource directly selected by the user as long as the resource is identified by an operation of the user (authentication in the case of a schedule). Examples of automatically selected resources may include, in addition to a schedule, a file and a site that are predetermined as user initial settings and are automatically read at the authentication of the user.

The remote connection unit 60 performs remote sharing of, for example, written information, a camera image, and/or a microphone sound with other electronic blackboards 14.

When, for example, an item is selected by the user of a first electronic blackboard 14 from selection candidates such as schedules, files, storage folders, and shared sites and a second electronic blackboard 14 selecting the same item as the item selected by the user is found, the remote connection unit 60 of the first electronic blackboard 14 performs remote sharing by using the IP address of the second electronic blackboard 14 as a remote connection destination.

<Processes>

Figure 12:
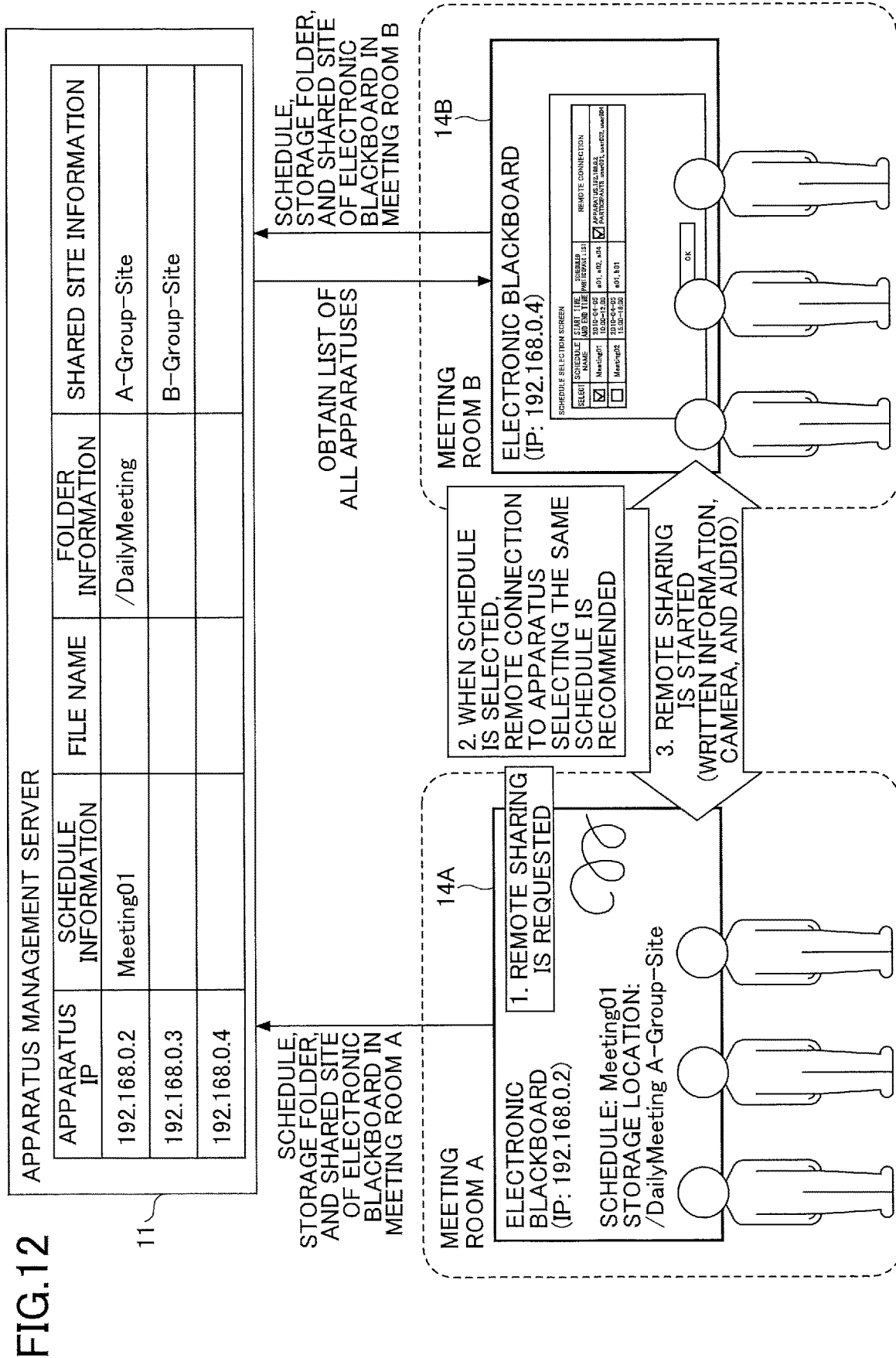
FIG. 12 is a drawing illustrating a process performed in the information processing system according to an embodiment.

FIG. 12 is a drawing illustrating a process performed in the information processing system 1 of the present embodiment. FIG. 12 illustrates an example where remote sharing is performed between an electronic blackboard 14A installed in "meeting room A" and an electronic blackboard 14B installed in "meeting room B". Each of the electronic blackboards 14A and 14B includes a function for performing remote sharing of, for example, written information, a camera image, and/or a microphone sound with another electronic blackboard 14. Here, it is assumed that remote sharing can be performed when an IP address of an electronic blackboard 14 to be remotely connected is available.

In the information processing system 1 of the present embodiment, it is assumed that the electronic blackboards 14A and 14B, which perform remote sharing, use the schedule service 42, the file service 44, and the shared site service 46 of the external service system 12.

For example, each of the electronic blackboards 14A and 14B performing remote sharing includes a function that enables the user to select meeting schedule information being managed by the schedule service 42 and reads an attached file of the selected meeting schedule information. Also, each of the electronic blackboards 14A and 14B performing remote sharing includes a function that enables the user to select a file to be read from the file service 44 or the shared site service 46 and reads the selected file. Further, each of the electronic blackboards 14A and 14B performing remote sharing includes a function that enables the user to select a storage folder of the file service 44 or the shared site service 46 for storing a file containing written information and stores the file in the selected storage folder.

Meeting schedule information, files, storage folders, and shared sites (external service resources) selected by the electronic blackboards 14A and 14B are managed by the apparatus management server 11 as apparatus management information in association with the identifiers of the electronic blackboards 14A and 14B.

To perform remote sharing, the electronic blackboard 14 requests the user to select a resource such as meeting schedule information of an external service that is available to the user and searches apparatus management information being managed by the apparatus management server 11 for another electronic blackboard 14 selecting (using) the same resource as the resource of the external service selected by the user. When an electronic blackboard 14 selecting the same resource is found, the found electronic blackboard 14 is displayed as a remote connection destination or a candidate for the remote connection destination.

In the example of FIG. 12, it is assumed that the electronic blackboard 14A first selects meeting schedule information, a storage folder, and a shared site, and the electronic blackboard 14B selects meeting schedule information thereafter. The use of the electronic blackboard 14A is started after the meeting schedule information, the storage folder, and the shared site are selected by the user. Also, the electronic blackboard 14A requests the apparatus management server 11 to manage apparatus management information where the schedule "Meeting01" of the meeting schedule information, the storage folder "DailyMeeting", and the shared site "A-Group-Site" selected by the user are associated with the IP address "192.168.0.2" of the electronic blackboard 14A.

After the use of the electronic blackboard 14A is started, the electronic blackboard 14B is requested by the user to display a schedule selection screen described later. The electronic blackboard 14B obtains the schedule "Meeting01" as a selection candidate for the user from the schedule service 42. Based on apparatus management information obtained from the apparatus management server 11, the electronic blackboard 14B finds the electronic blackboard 14A selecting the same schedule as the selection candidate schedule "Meeting01". The electronic blackboard 14B displays the IP address "192.168.0.2" of the found electronic blackboard 14A on the schedule selection screen as a connection destination candidate.

Thus, with the information processing system 1 of the present embodiment, the electronic blackboard 14 can display another electronic blackboard 14 selecting the same resource as a remote connection destination or a remote connection destination candidate for the user. This makes it possible to reduce the workload of the user in selecting an electronic blackboard 14 as a remote connection destination. For example, when the user needs to input a series of numbers such as an IP address that does not have a particular meaning for the user for remote connection, the user may enter wrong numbers and may connect the apparatus to a wrong destination. In the information processing system 1 of the present embodiment, a remote connection destination or a remote connection destination candidate is identified based on a resource such as a schedule intentionally selected by the user. This makes it possible to prevent an error and prevent the apparatus from being connected to a wrong destination. Also, even compared with a case where a list of connection destinations is simply displayed like a telephone directory, the configuration of the information processing system 1 of the present embodiment makes it possible to further narrow down remote connection destinations or remote connection destination candidates and makes it possible to further reduce the chance of an error and a wrong connection.

Figure 13:
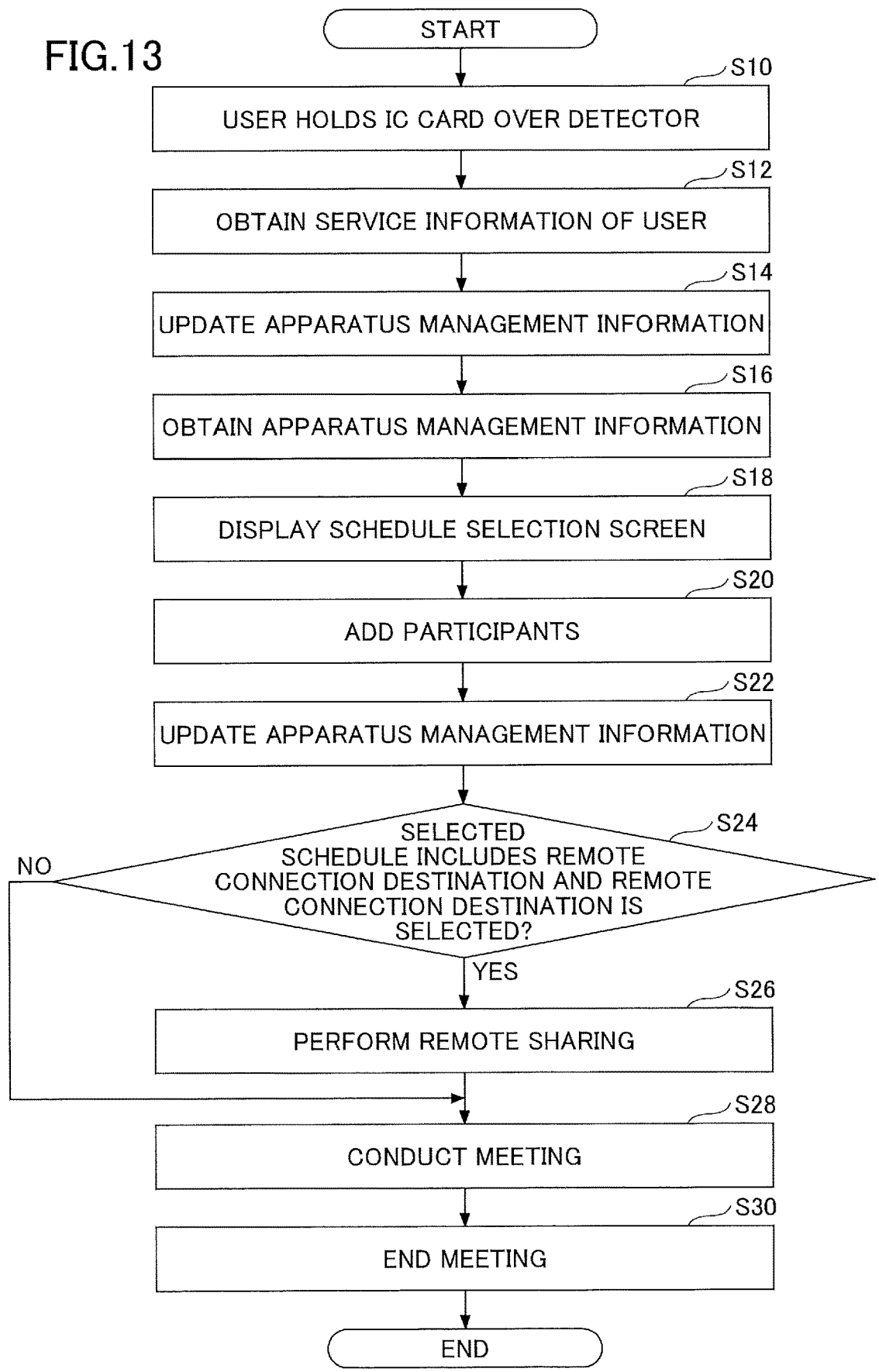
FIG. 13 is a flowchart illustrating an example of a process performed in the information processing system according to an embodiment.

Next, a remote sharing process is described. FIG. 13 is a flowchart illustrating an example of a process performed in the information processing system 1 of the present embodiment. In the example of FIG. 13, a schedule in the meeting schedule information is used as a resource based on which a remote connection destination is displayed. However, a remote connection destination may also be displayed based on a file, a storage folder, or a shared site.

At step S11, the user holds the IC card 700 over the IC card detector 64 of the electronic blackboard 14. The IC card detector 64 reads identification information from the IC card 700 of the user.

At step S12, the participant manager 56 obtains the identification information read by the IC card detector 64. The participant manager 56 sends the obtained identification information to the user information server 10 to obtain service information of the user corresponding to the identification information. In the case of the user information list of FIG. 9 and the service information list of FIG. 10, when the obtained identification information is "ICCARD-123", the user ID "user001" is identified based on the user information list of FIG. 9, and service information illustrated in FIG. 14 is identified based on the service information list illustrated of FIG. 10. FIG. 14 is a drawing illustrating an example of service information identified based on obtained identification information.

At step S14, the meeting schedule setting unit 50 sends the user ID of the user holding the IC card 700 over the IC card detector 64 and the IP address of the electronic blackboard 14 to the apparatus management server 11 and thereby requests the apparatus management server 11 to update the apparatus management information illustrated in, for example, FIG. 11.

At step S16, the meeting schedule setting unit 50 of the resource selection receiver 100 obtains the apparatus management information of FIG. 11 from the apparatus manager 30 of the apparatus management server 11. At step S18, the meeting schedule setting unit 50 obtains meeting schedule information that includes the user in the scheduled participant list from the schedule service 42 based on the service information of the user obtained by the participant manager 56.

Figure 15:
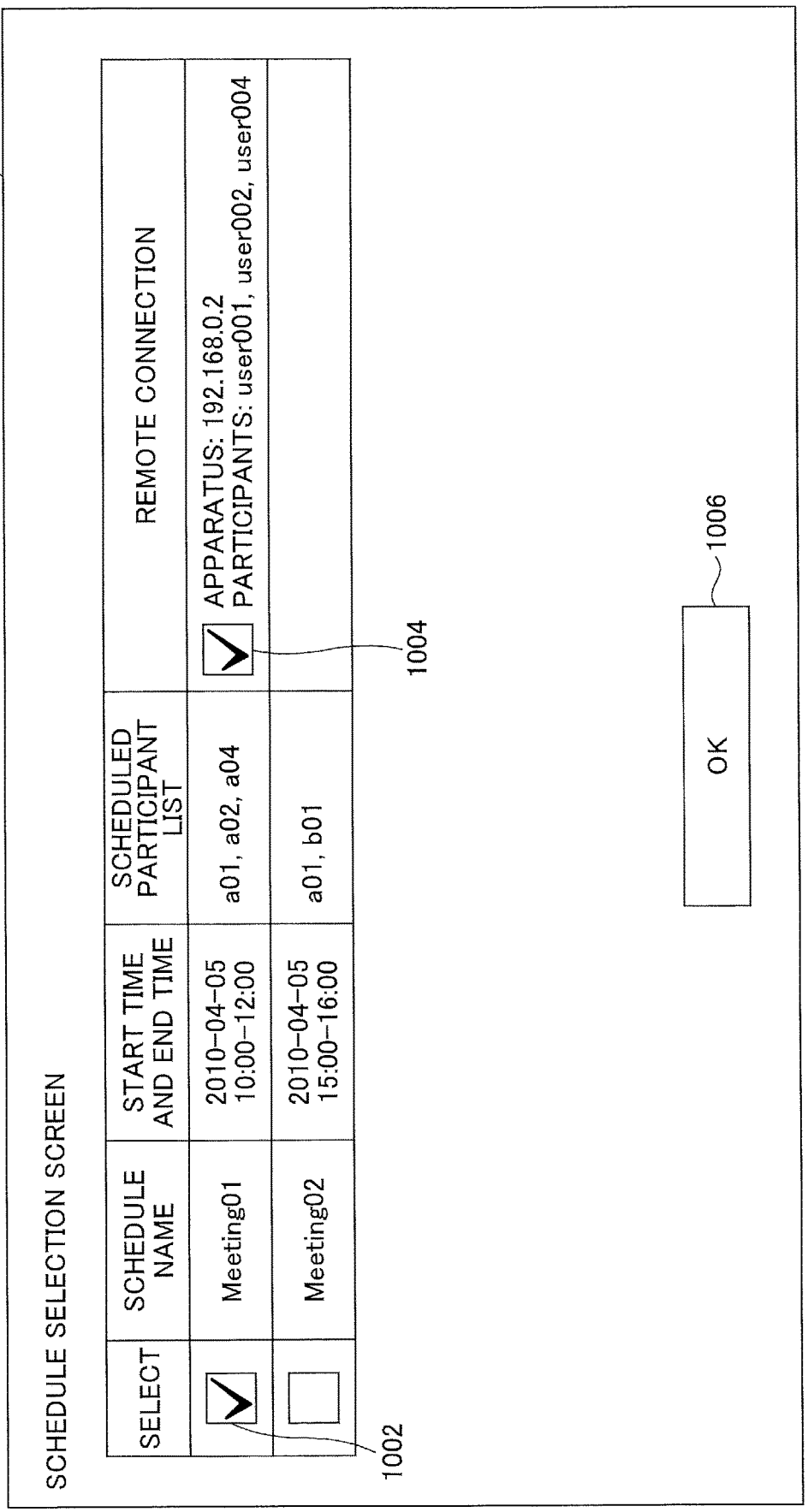
FIG. 15 is a drawing illustrating an example of a schedule selection screen.

Based on the obtained meeting schedule information and apparatus management information, the meeting schedule setting unit 50 displays, for example, a schedule selection screen 1000 illustrated in FIG. 15. FIG. 15 is a drawing illustrating an example of the schedule selection screen 1000. The schedule selection screen 1000 is used by the user identified by the participant manager 56 to select a schedule. In the schedule selection screen 1000 of FIG. 15, when another electronic blackboard 14 selecting the same schedule as one of the schedules (selection candidate schedules) in the obtained meeting schedule information is found, the IP address of the found electronic blackboard 14 and participants of the found electronic blackboard 14 are displayed as information on the found electronic blackboard 14 as a remote connection destination. The user can select one of the selection candidate schedules by selecting a selection checkbox 1002 of the schedule selection screen 1000 of FIG. 15 and pressing an OK button 1006.

For example, the schedule selection screen 1000 of FIG. 15 illustrates schedules including the user ID "user001" and to be held on "2010/04/05". Similarly to the apparatus management information of FIG. 11, the schedule selection screen 1000 of FIG. 15 displays an example where a schedule with the schedule name "Meeting01" is selected, the electronic blackboard 14 with the IP address "192.168.0.2" is a remote connection destination, and users with user IDs "user001", "user002", and "user004" are participants.

At step S20, the meeting schedule setting unit 50 sends the external service user IDs included in the scheduled participant list of the schedule selected by the user on the schedule selection screen 1000 of FIG. 15 to the user information unit 20, and thereby adds the corresponding user IDs of the electronic blackboard system as participants.

At step S22, the meeting schedule setting unit 50 sends the information on the schedule selected by the user, the IP address of the electronic blackboard 14, and the participants to the apparatus management server 11 to update the apparatus management information as exemplified in FIG. 11.

At step S24, when the schedule selected by the user includes a remote connection destination and the remote connection destination is selected by selecting a checkbox 1004, the remote connection unit 60 proceeds to step S26. The schedule selected by the user at step S24 is obtained, for example, based on authentication information (e.g., an authentication token for an external service) of an external service user that is identified based on a user ID of the user who has logged in by holding the IC card 700 over the IC card detector 64 of the electronic blackboard 14. The remote connection unit 60 can perform remote sharing with another electronic blackboard 14 displayed as a remote connection destination in the schedule selected by the user. Multiple electronic blackboards 14 performing remote sharing proceed to step S28 and allow users to conduct a meeting by sharing written information, camera images, and/or microphone sounds.

At step S24, when the schedule selected by the user does not include a remote connection destination or the remote connection destination is not selected, i.e., the checkbox 1004 is not selected, the remote connection unit 60 skips step S26. When step S26 is skipped, the electronic blackboard 14 proceeds to step S28 and allows the users to conduct a meeting without sharing written information, camera images, and microphone sounds. Thus, when the same schedule is selected but remote sharing is not desired, the user may unselect the checkbox 1004.

When, for example, the user presses a meeting end button to end the meeting, the participant manager 56 sends an update-command to the apparatus management server 11 to request the apparatus management server 11 to reset the apparatus management information of the electronic blackboard 14. Resetting the apparatus management information indicates, for example, emptying the schedule name, the file name, the storage folder, and the shared site information in the apparatus management information of FIG. 11. The participant manager 56 also instructs the blackboard display 58 to erase displayed information.

When the user presses the meeting end button, for example, the electronic blackboard 14 may log off the user who logged in with the IC card 700, and may also go into a sleep mode or turn off the power.

FIGS. 16 through 18, respectively, illustrate examples of screens that are used when a file, a storage folder, and a shared site are used as resources based on which remote connection destinations are displayed. FIG. 16 is a drawing illustrating an example of a file selection screen. FIG. 17 is a drawing illustrating an example of a storage folder selection screen. FIG. 18 is a drawing illustrating an example of a shared site selection screen.

A file selection screen 1100 of FIG. 16 is used by an identified user to select a file. When another electronic blackboard 14 selecting the same file as a selection candidate file is found, the file selection screen 1100 of FIG. 16 displays an IP address and participants of the found electronic blackboard 14 as information on a remote connection destination. The user can select one file from selection candidate files by selecting a selection checkbox 1102 on the file selection screen 1100 of FIG. 16 and pressing an OK button 1106.

A storage folder selection screen 1200 of FIG. 17 is used by an identified user to select a storage folder. When another electronic blackboard 14 selecting the same storage folder as a selection candidate storage folder is found, the storage folder selection screen 1200 of FIG. 17 displays an IP address and participants of the found electronic blackboard 14 as information on a remote connection destination. For example, the user can select one storage folder from selection candidate storage folders by selecting a selection checkbox 1202 on the storage folder selection screen 1200 of FIG. 17 and pressing an OK button 1206.

A shared site selection screen 1300 of FIG. 18 is used by an identified user to select a shared site. When another electronic blackboard 14 selecting the same shared site as a selection candidate shared site is found, the shared site selection screen 1300 of FIG. 18 displays an IP address and participants of the found electronic blackboard 14 as information on a remote connection destination.

FIG. 18 illustrates an example where multiple options (shared sites) including connection destination candidates (remote connection destinations) are found, and connection destination candidates are displayed for the respective options. For example, the user can select one shared site from the selection candidate shared sites by selecting a selection checkbox 1302 on the shared site selection screen 1300 of FIG. 18 and pressing an OK button 1306.

Also, in the shared site selection screen 1300 of FIG. 18, the user can select one or more connection destination candidates (remote connection destinations) in the same option (shared site) by selecting a selection checkbox 1304. For example, the shared site selection screen 1300 of FIG. 18 displays, as other electronic blackboards 14 or connection destination candidates selecting a selection candidate shared site with a shared site name "C-Group-Site", electronic blackboards 14 having IP addresses "192.168.0.35" and "192.168.0.52" and already performing remote sharing and an electronic blackboard 14 having an IP address "192.168.0.57" and not performing remote sharing.

The user can perform remote sharing with the electronic blackboards 14 having IP addresses "192.168.0.35" and "192.168.0.52" and already performing remote sharing by selecting the selection checkbox 1304.

As described above, according to the information processing system 1 of the present embodiment, when an external resource is selected by the electronic blackboard 14, other electronic blackboards 14 selecting the same external resource can be displayed as remote connection destination candidates. This makes it possible to reduce the workload of a user in searching and selecting a remote connection destination to perform remote sharing.

An information processing apparatus, an information processing system, and a remote sharing method according to the embodiment of the present invention are described above. However, the present invention is not limited to the specifically disclosed embodiment, and variations and modifications may be made without departing from the scope of the present invention. The information processing system 1 described in the above embodiment is an example, and the system configuration may be changed depending on applications and purposes. The display 680 is an example of a display device.

Each of the functional components described in the above embodiment may be implemented by one or more processing circuits. In the present application, the term "processing circuit" may indicate a processor that is implemented by an electronic circuit and programmed by software to implement various functions, or a device such as an application specific integrated circuit (ASIC), a digital signal processor (DSP), a field programmable gate array (FPGA), or a circuit module designed to implement various functions described above.

The apparatuses described above merely indicate one of multiple computing environments for implementing the embodiment described in the present application.

In an embodiment, each of the user information server 10 and the apparatus management server 11 may include multiple computing devices such as server clusters. The multiple computing devices may be configured to communicate with each other via a communication link such as the network 16 or a shared memory and perform processes disclosed in the present application. Similarly, the electronic blackboard 14 may include multiple computing devices configured to communicate with each other.

Further, the user information server 10, the apparatus management server 11, and the electronic blackboard 14 may be configured to share processes described above in various combinations. For example, a process performed by a given unit may be performed by the electronic blackboard 14. Similarly, a function of a given unit may be implemented by the electronic blackboard 14. Also, the user information server 10, the apparatus management server 11, and the electronic blackboard. 14 may be implemented by one apparatus or multiple apparatuses.

The electronic blackboard 14 may be replaced with, for example, an output device such as a projector (PJ) or a digital signage, a head-up display (HUD), an industrial machine, an imaging device, a sound collector, a medical device, a network home appliance, an automobile (Connected Car), a mobile phone, a game machine, a personal digital assistant (PDA), a digital camera, or a wearable PC.

What is claimed is:

1. An information processing apparatus, comprising:
a processor programmed to execute a process including
obtaining, from apparatus management information associating identifiers of other information processing apparatuses with resources of services being used by the other information processing apparatuses, one or more of the identifiers of the other information processing apparatuses associated with resources of a service available to a user,
displaying the obtained one or more of the identifiers of the other information processing apparatuses on a display device as remote connection destinations in association with the resources of the service available to the user such that the resources of the service available to the user are selectable, and
performing remote sharing with one or more of the other information processing apparatuses whose identifiers are associated with a resource selected on the display device from the resources of the service available to the user.

2. The information processing apparatus as claimed in claim 1, wherein the resources of the service available to the user include schedule information provided by an external service via a network.

3. The information processing apparatus as claimed in claim 1, wherein the resources of the service available to the user include at least one of information on a file read from an external service via a network and information on a storage destination where the file is stored.

4. The information processing apparatus as claimed in claim 1, wherein the processor is programmed to display, for each of the resources of the service available to the user, one or more of the identifiers of the other information processing apparatuses associated with the each of the resources of the service available to the user as selectable candidates for the remote connection destinations.

5. An information processing system, comprising:
multiple information processing apparatuses; and
a server, wherein
the server is configured to manage apparatus management information associating identifiers of the information processing apparatuses with resources of services being used by the information processing apparatuses; and each of the information processing apparatuses includes a processor programmed to execute a process including
  obtaining, from the apparatus management information, one or more of the identifiers of other information processing apparatuses associated with resources of a service available to a user,
  displaying the obtained one or more of the identifiers of the other information processing apparatuses on a display device as remote connection destinations in association with the resources of the service available to the user such that the resources of the service available to the user are selectable, and
  performing remote sharing with one or more of the other information processing apparatuses whose identifiers are associated with a resource selected on the display device from the resources of the service available to the user.

6. A method performed by an information processing apparatus, the method comprising:
  obtaining, from apparatus management information associating identifiers of other information processing apparatuses with resources of services being used by the other information processing apparatuses, one or more of the identifiers of the other information processing apparatuses associated with resources of a service available to a user;
  displaying the obtained one or more of the identifiers of the other information processing apparatuses on a display device as remote connection destinations in association with the resources of the service available to the user such that the resources of the service available to the user are selectable; and
  performing remote sharing with one or more of the other information processing apparatuses whose identifiers are associated with a resource selected on the display device from the resources of the service available to the user.

* * * * *